Feb. 19, 1929.
F. DOWNING
1,702,818
AUTOMOBILE DOOR AWNING
Filed Jan. 31, 1927
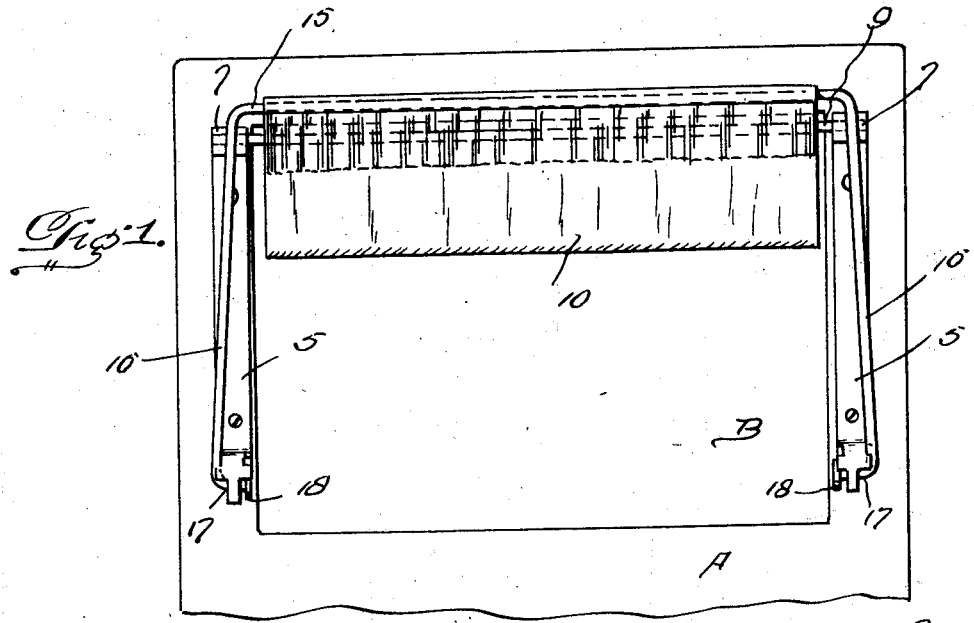
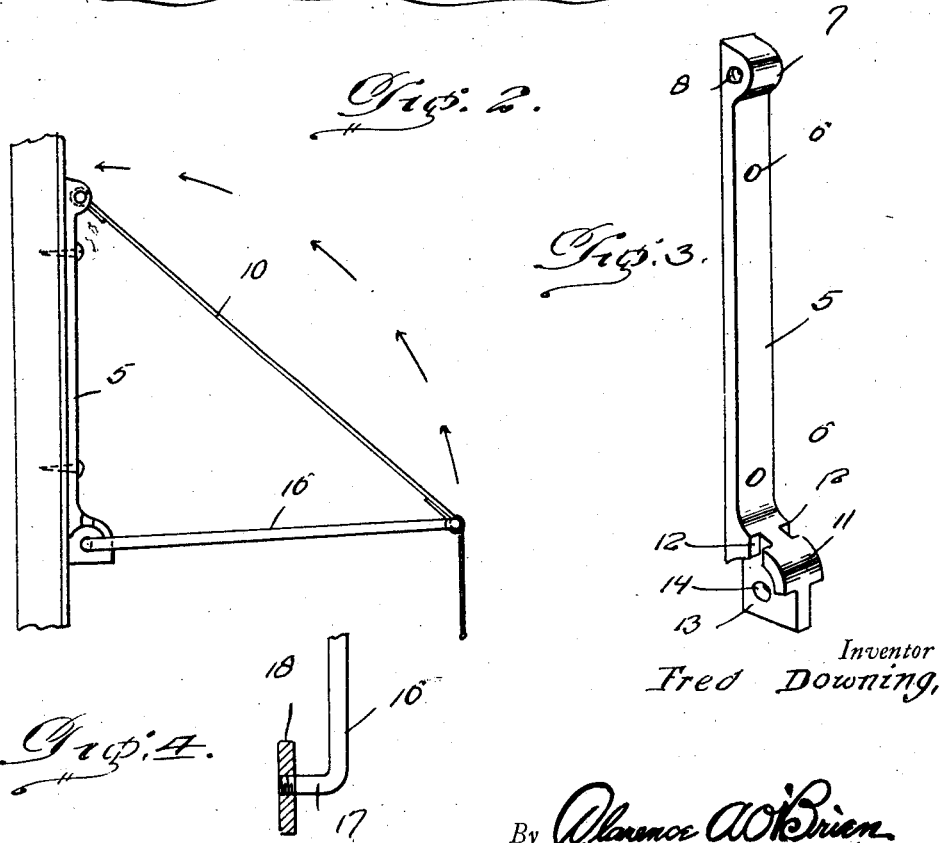
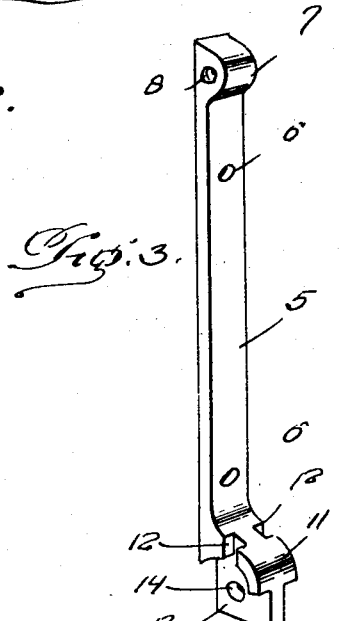
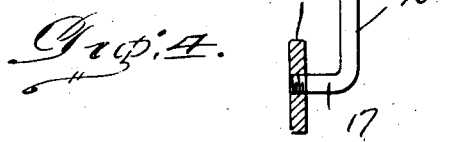
Inventor
Fred Downing,
By Clarence A. O'Brien
Attorney Patented Feb. 19, 1929.

1,702,818

UNITED STATES PATENT OFFICE.

FRED DOWNING, OF CAMBRIDGE, MARYLAND.

AUTOMOBILE DOOR AWNING.

Application filed January 31, 1927. Serial No. 164,945.

This invention relates to new and useful improvements in awnings, primarily but not specifically adapted for use upon the doors of automobiles so that the interior thereof may be properly shaded.

The primary object of the invention resides in the provision of an awning of this character that may be readily and easily applied to the doors of all types of closed automobiles without marring the same or without in any manner altering the construction of said doors.

A further important object is to provide an awning of this character that is so constructed as to permit the awning strip to be extended into shading position or in raised position when not desired for use and wherein such strip will be maintained in the two positions without requiring a spring roller or other means foreign to the awning and hanging structure per se.

A further object is to provide an awning of the above mentioned character, which is mounted on an automobile door in such a manner as to permit the raising and lowering of the window without interfering with the awning.

An additional object is to provide an awning of this character that is extremely simple of construction and inexpensive of manufacture, the same embodying but few parts and these so corelated as to reduce the possibility of disarrangement to a minimum.

With the foregoing and other objects in view as the nature of the invention will be better understood, the same comprises the novel form, combination and arrangement of parts hereinafter more fully described, shown in the accompanying drawing and claimed.

In the drawing wherein like reference characters indicate corresponding parts throughout the several views:

Figure 1 is a fragmentary front elevation of a conventional closed automobile body door equipped with my improved awning, the same being disclosed as in folded condition.

Figure 2 is an edge elevation disclosing the awning as extended to shading position.

Figure 3 is a perspective of one of the supporting brackets, the construction of which is one of the essential features of the present invention, and Figure 4 is an end elevation of one of the side legs of a spring wire frame to which is attached the lower end of the awning strip disclosing a detachable thumb button arranged thereon so as to facilitate the outward swinging of said legs to permit the frame to be swung to vertical or horizontal position for controlling the opening or closing of the awning strip.

Now having particular reference to the drawing, A designates fragmentarily a conventional design of closed automobile door having a window opening B therein. In carrying out the invention I provide a pair of metallic strap like brackets 5—5 of predetermined length and formed adjacent their opposite ends with openings 6—6 so as to facilitate the attachment of the same to the outer side of the door A at opposite edges of the window opening B therein. The upper end of each strap bracket is formed at its front surface with a boss 7 formed with a horizontal bore 8 therethrough. Arranged within the bores of these bracket bosses 7—7 are the ends of a stationary rod 9 to which is attached the inner end of a strip of awning fabric 10.

The lower end of each strap bracket 5 is formed with an outwardly projecting boss 11 of segmental formation having at its opposite edges notches 12—12. Depending from the center of each boss 11 is a tongue 13 having at its center a round opening 14.

The invention further consists of a relatively U-shaped spring wire frame 15 to the horizontal portion of which is connected the opposite end of the awning fabric 10 as clearly indicated in both Figures 1 and 2. The distance between the side legs 16—16 of said U-shaped frame is substantially equivalent to the distance between the center of one bracket to the center of the other bracket when the same are secured to the automobile door as suggested in Figure 1. The extreme lower ends of these side legs 16—16 are bent inwardly so as to provide pintles 17—17 for engagement within the openings 14 of the strap tongues 13.

After the pintle ends of said legs 16—16 are arranged through the openings 14 in the bracket tongues 13 there is threaded thereon at the inner sides of the tongues thumb plates 18—18 for facilitating the outward movement of the side legs so that the frame may be raised or lowered.

Obviously from a consideration of Figure 1 it will be readily understood that when the frame 15 is moved downwardly to substantially horizontal position for placing the awning strip 10 in shading position, the side legs 16—16 will spring beneath the strap bracket bosses 11—11 for preventing the accidental raising of the frame and awning strip. However, when it is desired to raise the awning it is only necessary to press outwardly upon the buttons 18—18 for expanding the side legs 16—16 of the bracket until the same have been forced outwardly of the strap bracket bosses 11—11. The frame may then be extended upwardly as in Figure 1 until the legs reach the notches 12 of the bracket bosses at the outer edges thereof, whereupon by reason of the springy nature of these legs, the same will spring into the notches and maintain the awning from accidental downward movement.

By reason of the notches 12—12 at opposite edges of the bracket bosses 11, said brackets are interchangeable.

In view of the foregoing description when considered in conjunction with the accompanying drawing the operation and advantages of an awning for automobile doors of this character will be readily appreciated by those skilled in the art, and even though I have herein shown and described the invention as consisting of certain structural elements it is nevertheless to be understood that some changes may be made therein without affecting the spirit and scope of the appended claim.

Having thus described the invention, what I claim as new and desire to secure by Letters Patent is:—

In combination, a bracket comprising a strap-like member adapted to be secured vertically on a support, a tongue depending from the lower end of the strap like member at the central portion thereof and disposed at right angles to said strap-like member, said tongue being provided with a pivot pin receiving opening, arcuate flanges extending from the opposite sides of the upper portion of said tongue and being curved downwardly, each of said flanges being formed with a notch in the crown portion thereof, a spring arm, a pintle carried by the lower end of the arm and adapted for disposition through the opening in said tongue to permit vertical swinging movement of the arm when disposed outwardly of the outer edge of the flange on the outermost side of the tongue, said spring arm being disposed within the notch in the outermost flange when in a raised position and adapted to engage the end of the flange that is remote from the strap like member when in a lowered position, and a button on the free end of a pintle for manually forcing the spring arm outwardly to permit vertical swinging movement thereof, said button being arranged below the arcuate flange formed on the inner side face of the tongue.

In testimony whereof I affix my signature.

FRED DOWNING.